United States Patent
Matsubara et al.

(10) Patent No.: US 9,400,560 B2
(45) Date of Patent: Jul. 26, 2016

(54) IMAGE DISPLAY DEVICE AND DISPLAY CONTROL METHOD THEREOF

(75) Inventors: Takashi Matsubara, Chigasaki (JP); Masumi Moritani, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 574 days.

(21) Appl. No.: 12/889,471

(22) Filed: Sep. 24, 2010

(65) Prior Publication Data

US 2011/0080337 A1    Apr. 7, 2011

(30) Foreign Application Priority Data

Oct. 5, 2009  (JP) ................................. 2009-231707

(51) Int. Cl.
*G06F 3/01* (2006.01)
*G06K 9/00* (2006.01)

(52) U.S. Cl.
CPC ............ *G06F 3/017* (2013.01); *G06K 9/00355* (2013.01); *G06K 9/00375* (2013.01)

(58) Field of Classification Search
CPC ........... G09G 5/00; G06F 3/005; G06F 3/017; G06F 3/01; G06K 9/00355; G06K 9/00375
See application file for complete search history.

(56) References Cited

U.S. PATENT DOCUMENTS

| | | | |
|---|---|---|---|
| 7,577,199 B1 * | 8/2009 | Herz ........................ | 375/240.16 |
| 7,746,321 B2 * | 6/2010 | Banning ....................... | 345/157 |
| 7,834,847 B2 * | 11/2010 | Boillot et al. ................. | 345/156 |
| 2002/0041327 A1 * | 4/2002 | Hildreth et al. .................. | 348/42 |
| 2007/0146320 A1 * | 6/2007 | Kubota .......................... | 345/157 |
| 2010/0157254 A1 * | 6/2010 | Ishii ................................ | 353/69 |
| 2010/0278393 A1 * | 11/2010 | Snook et al. .................. | 382/107 |
| 2010/0302138 A1 * | 12/2010 | Poot et al. ...................... | 345/156 |

FOREIGN PATENT DOCUMENTS

| | | |
|---|---|---|
| JP | 09-081307 | 3/1997 |
| JP | 2006-209359 | 8/2006 |
| JP | 2006-323454 | 11/2006 |
| JP | 4318056 | 6/2009 |

* cited by examiner

*Primary Examiner* — William Boddie
*Assistant Examiner* — Bryan Earles
(74) *Attorney, Agent, or Firm* — Baker Botts L.L.P.

(57) ABSTRACT

Disclosed is an image display device capable of recognizing a hand of a user and predefining an operating region. Image recognition means recognizes the position of a hand of the user. Operating region setup means predefines the operating region, on an imaging region plane of imaging means and around a position on which the user's hand is projected, for the purpose of enabling the user to issue instructions to the image display device. When the position on which the user's hand is projected moves and comes close to the periphery of the operating region, the operating region setup means moves the operating region in the direction of the movement of the position on which the user's hand is projected. Further, the image recognition means recognizes a hand-waving motion of the user, whereas the operating region setup means sets the size of the operating region in accordance with the magnitude of the user's hand-waving motion. Consequently, the image display device provides increased ease of operation and makes it possible to define the operating region in accordance with a user's intention without imposing a significant processing load on itself.

2 Claims, 8 Drawing Sheets

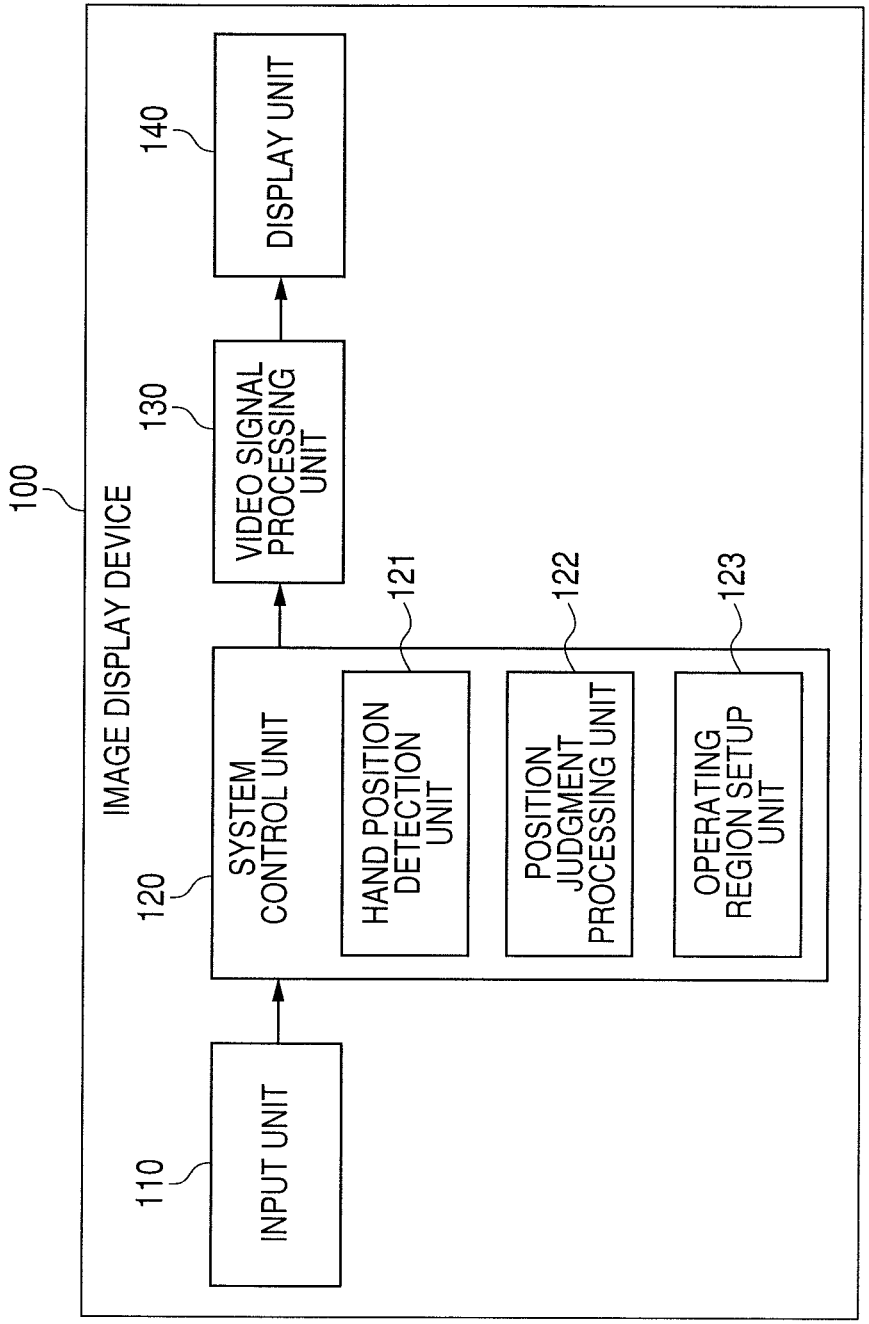

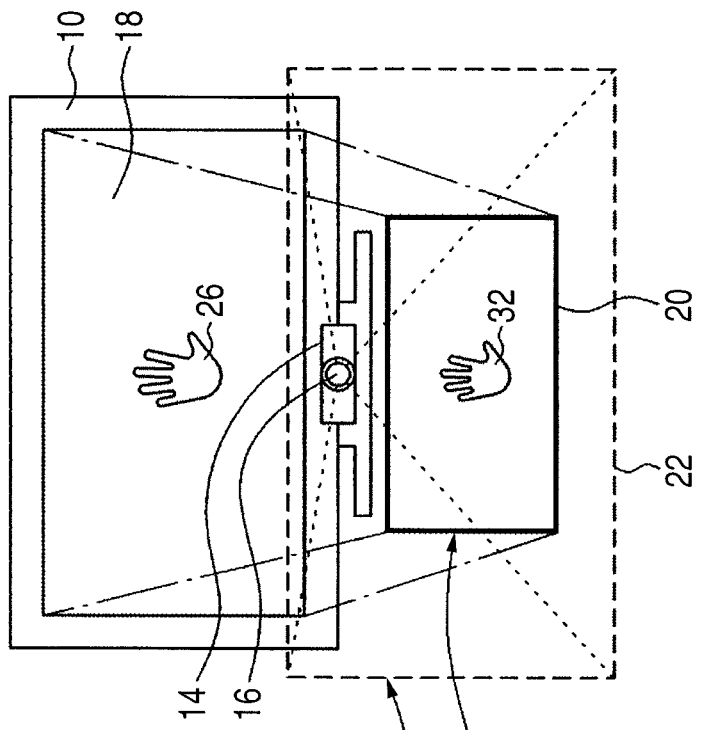
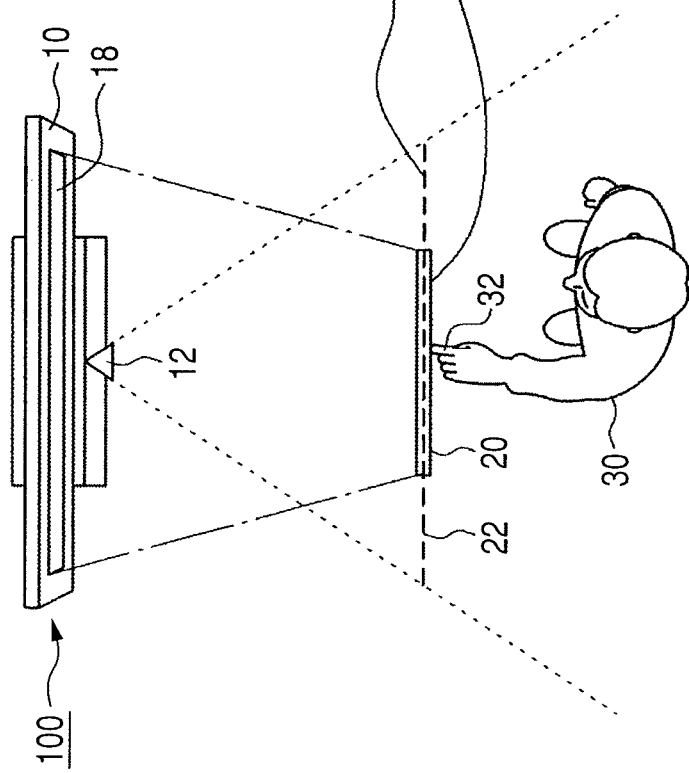

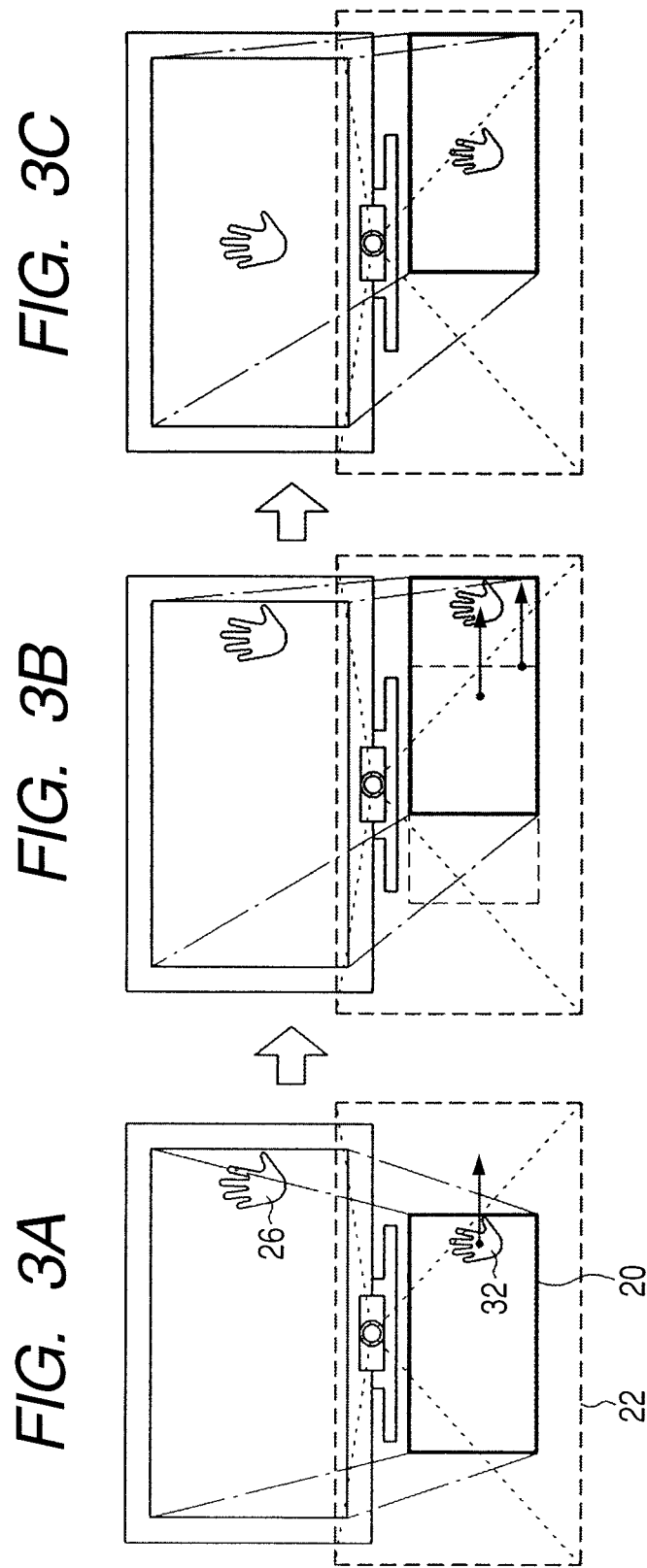

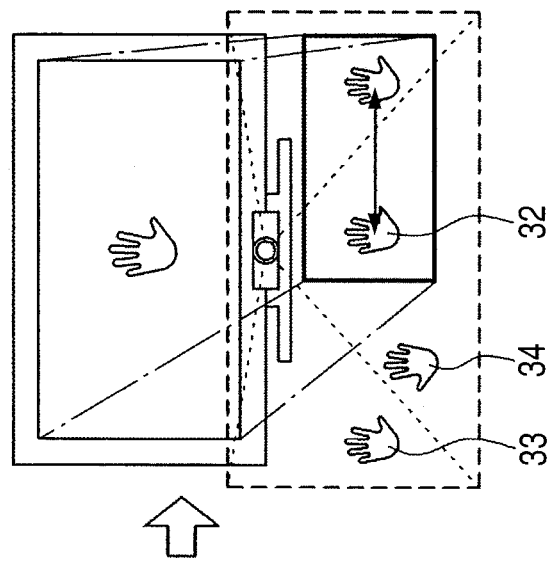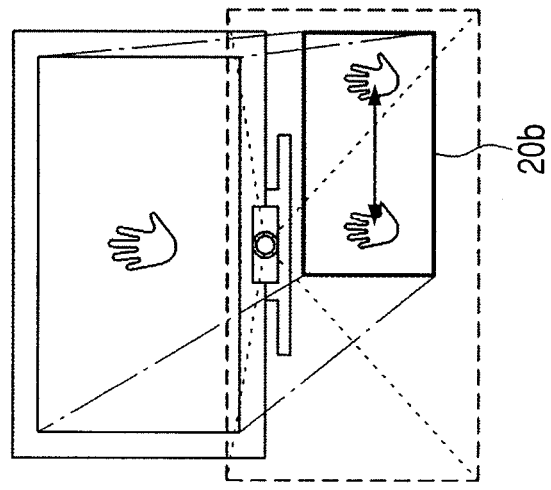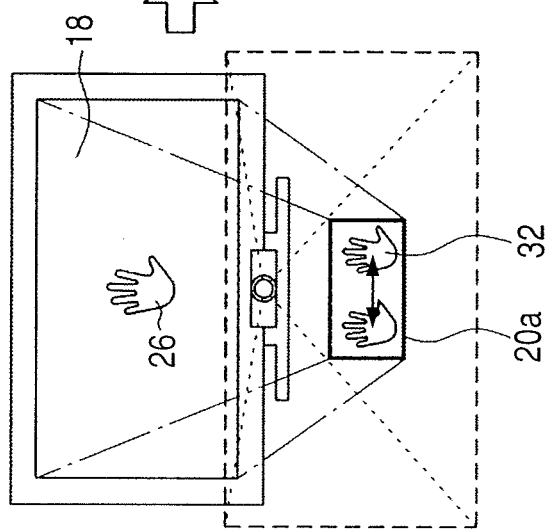

IMAGE DISPLAY DEVICE AND DISPLAY CONTROL METHOD THEREOF

CLAIMS OF PRIORITY

The present application claims priority from Japanese patent application serial no. JP2009-231707, filed on Oct. 5, 2009, the content of which is hereby incorporated by reference into this application.

BACKGROUND OF THE INVENTION (1) Field of the Invention

The present invention relates to an image display device and a display control method thereof. More particularly, the present invention relates to an image display device that visually recognizes a user's gesture to enhance the user-friendliness of an interface giving instructions to an electronic device, and a display control method thereof.

(2) Description of the Related Art

In the past, users of a TV, a video recorder, or other video device or a PC or other information processing device generally entered data or commands with a keyboard or a pointing device, such as a mouse, or performed a channel selection or image display procedure with a remote controller.

Due to the improvement of an image recognition technology in recent years, however, a method of visually recognizing a user's gesture, determining the user's intention in accordance with the result of recognition, and operating a device accordingly has been proposed particularly in the field of gaming devices and operating guide devices.

An image recognition device disclosed, for instance, in Japanese Patent No. 4318056 recognizes the form and motion of hands and fingers and identifies an intended operation.

The image recognition device disclosed in Japanese Patent No. 4318056 creates an operating plane on a marker corresponding to a body position, and recognizes instructions in accordance with the positional movement of a hand or finger in the operating plane. The operating plane is a virtual operating plane. According to Paragraph 0033 of Japanese Patent No. 4318056, "an operator 102 can perform an input procedure with ease by extending his/her hand 601 to an operating plane 701 which is virtually defined in accordance with a marker 101, or by moving the hand 601 so as to touch a part of the screen of a monitor 111 and the operating plane 701 in the same manner as for a touch panel."

However, the image recognition device disclosed in Japanese Patent No. 4318056 has the following disadvantages because it defines the operating plane in accordance with the body position:
(1) The timing of calibration cannot be determined with ease because the position of the operating plane is determined before the operator extends his/her hand. If, in particular, there are two or more persons in front of the screen, it is practically impossible to select one person as a target for which an operating region is to be defined.
(2) Processing load is increased because the body position is to be recognized.
(3) Positioning is difficult to achieve when, for instance, the operator is in a lying position.

Another conceivable method is to recognize a user's hand and define the region of an operating plane in accordance with the position of the hand. The processing load is low when merely the hand is to be recognized. The reason is that recognition can be achieved with relative ease by grasping the characteristics of the hand.

However, when the above method is used to determine the position of the operating region, it is at a disadvantage in that the timing of calibration cannot be determined with ease.

FIG. 8 illustrates a case where the operating region is created near the waist of a user when the user extends his/her hand from below.

When, for instance, the user extends his/her hand from below, the operating region 80 is created near the user's waist as the moving hand is positioned close to the waist, as shown in FIG. 8. The operating region 80 created in this manner is positioned apart from an operating region 81 that is presumed to be handled by the user. Consequently, the user cannot perform an operation with ease.

The present invention has been made to address the above problems, and provides an easy-to-operate image display device that recognizes a user's hand and defines an operating region in accordance with the user's intention without imposing a significant processing load on itself.

SUMMARY OF THE INVENTION

The image display device according to the present invention picks up an image of a user with a camera or other imaging means, causes image recognition means to recognize an image presented by image data acquired by the imaging means, and issues instructions concerning a user's operation in accordance with the result of image recognition. The image recognition means recognizes the position of a hand of the user, and causes operating region setup means to predefine an operating region, on an imaging region plane of the imaging means and around a position on which the user's hand is projected, for the purpose of enabling the user to issue instructions to the image display device. The operating region setup means then moves the operating region within the imaging region plane in accordance with the relative positional relationship between the position on which the user's hand is projected and the operating region. More specifically, when the position on which the user's hand is projected moves and comes close to the operating region, the operating region moves in the direction of the movement of the position on which the user's hand is projected, and is then set at a position reached by the projection of the user's hand. Further, the image recognition means recognizes a hand-waving motion of the user, whereas the operating region setup means sets the size of the operating region in accordance with the magnitude of the user's hand-waving motion.

BRIEF DESCRIPTION OF THE DRAWINGS

FIG. 1 is a diagram illustrating the configuration of an image display device according to a first embodiment of the present invention.

FIGS. 2A and 2B are diagrams illustrating an operating region that is to be provided by the image display device according to the first embodiment of the present invention.

FIGS. 3A to 3C are diagrams illustrating the flow of an operating region setup process performed by the image display device according to the first embodiment of the present invention.

FIGS. 6A to 6C are diagrams illustrating the flow of the operating region setup process performed by the image display device according to the second embodiment of the present invention.

DETAILED DESCRIPTION OF THE PREFERRED EMBODIMENTS

Figure 4:
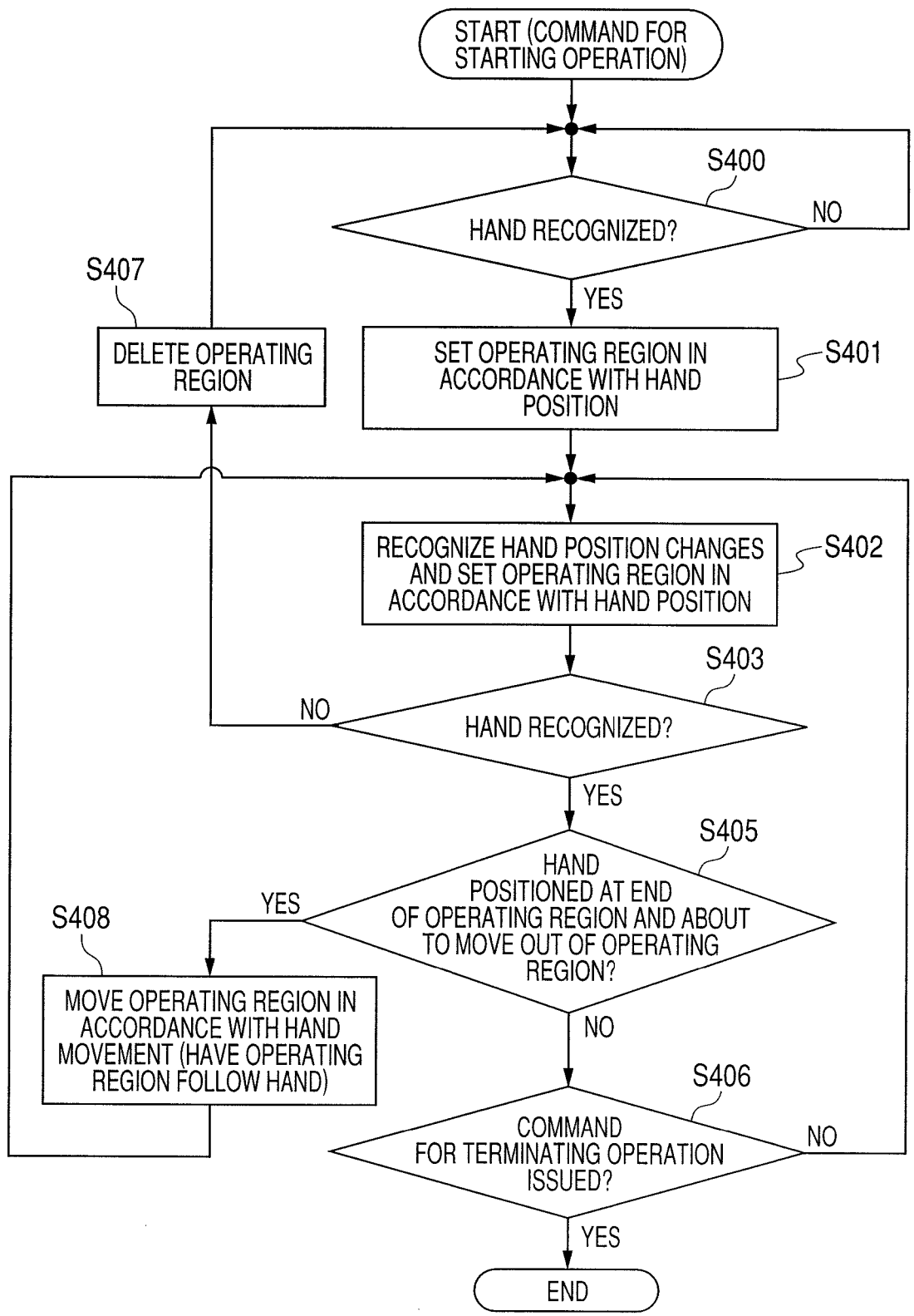
FIG. 4 is a flowchart illustrating the steps of the operating region setup process performed by the image display device according to the first embodiment of the present invention.

Embodiments of the present invention will be described below with reference to FIGS. 1 to 7.

First Embodiment

A first embodiment of the present invention will now be described with reference to FIGS. 1 to 4.

First of all, the configuration of an image display device according to the first embodiment of the present invention will be described with reference to FIG. 1.

FIG. 1 is a diagram illustrating the configuration of the image display device according to the first embodiment of the present invention.

As shown in FIG. 1, the image display device 100 according to the present embodiment includes an input unit 110, a system control unit 120, a video signal processing unit 130, and a display unit 140.

The input unit 110 picks up an image of a user. The input unit, for example, is an infrared camera, stereo camera, or RGB camera having a TOF (time-of-flight) sensor function. However, the camera used as the input unit 110 is not specifically limited to the above-mentioned ones. Any camera may be used as the input unit 110 as far as it is capable of eventually picking up an image for converting an acquired image to digital data for the purpose of performing image recognition with respect to the user.

The system control unit 120 detects the position of a hand of the user, and performs data processing to predefine an operating region at an appropriate position. The system control unit 120 may be implemented by allowing a CPU to execute a software module stored in a memory or by using a dedicated hardware circuit.

The system control unit 120 includes portions that implement the functions of a hand position detection unit 121, a position judgment processing unit 122, and an operating region setup unit 123.

The hand position detection unit 121 detects a hand position from digital image data. The position judgment processing unit 122 determines the positional relationship between the hand position and the operating region. The operating region setup unit 123 predefines the operating region.

The video signal processing unit 130 receives instructions and data from the system control unit 120 and creates a video signal for displaying an image on the display unit 140.

The display unit 140 presents an image to the user in accordance with the video signal. For example, the display unit is an LCD (Liquid Crystal Display), PDP (Plasma Display Panel), or other display device having a display.

An operating region setup process performed by the image display device 100 according to the first embodiment of the present invention will now be described with reference to FIGS. 2 and 3.

FIGS. 2A and 2B are diagrams illustrating an operating region that is to be provided by the image display device 100 according to the first embodiment of the present invention.

FIGS. 3A to 3C are diagrams illustrating the flow of the operating region setup process performed by the image display device 100 according to the first embodiment of the present invention.

An operation of the image display device 100 according to the first embodiment of the present invention is as shown in FIG. 2A. First of all, the user 30 makes a gesture while viewing the display 10. The image display device 100 then recognizes an image of the gesture, determines the operating region in accordance with the result of recognition, and prompts the user 30 to enter, for instance, a necessary command into the operating region. As shown in FIG. 2B, an infrared camera 12 is installed under the display 10. An LED 14 of the infrared camera 12 emits near-infrared rays. A lens 16 receives resulting reflected rays to pick up an image of the user 30. A key point of the present embodiment, in particular, is to recognize a user's hand. The hand 32 is a part of the body of the user 30 that is readily recognizable. It is assumed that the employed infrared camera 12 is a 3D camera capable of measuring the distance between the hand and a display screen.

When the image display device 100 performs image recognition and detects the hand 32, it determines the operating region 20 relative to an operating screen 18 of the display 10 according to the position at which the hand is detected. The operating region 20 is a virtual region where the user 30 is supposed to perform an operation. It is assumed that the operating region 20 is created in an imaging region plane 22 of the infrared camera 12 that corresponds to a position at which the user 30 stands. As shown in FIG. 2B, the operating region 20 is an enlarged/reduced version of the operating screen 18 of the display 10 and positioned in the imaging region plane 22 in front of the user. At first, the operating region 20 is determined so that the hand 32 of the user 30 is positioned at the center of the operating region 20. Then, as shown in FIG. 2B, the operating screen 18 displays a pointer 26 at a position corresponding to the position of the hand 32 of the user 30, in the operating region 20. Although the pointer 26 shown in FIG. 2B is shaped like a hand, it may alternatively be shaped, for instance, like an arrow mark, a circle, square, or other basic form, or a popular animation character.

The operating region 20 is determined in accordance with the position of the hand 32 and the distance between the hand 32 and the operating screen 18 so that an extended line of the hand 32 points to the screen. Therefore, the user 30 can issue instructions to the image display device 100 in a manner similar to the manner of using a hands-free laser pointer. The operating region 20 is invisible to the user 30. The user 30 does not particularly have to be aware of the position and size of the operating region. While the user performs a natural operation, the operating region dynamically becomes corrected.

When, for instance, the user 30 moves his/her hand 32 rightward within the operating region 20 as shown in FIG. 3A, the pointer 26 in the operating screen 18 also moves rightward. When the hand 32 is about to move beyond the right end of the operating region 20, it is assumed that the operating region 20 also moves rightward as shown in FIG. 3B. The operating region 20 can move in this manner as far as the imaging region plane 22 is not exceeded. In other words, when the position at which the hand 32 of the user 30 is detected moves and comes close to the periphery of the operating region 20, the operating region 20 moves in the direction of movement of the position at which the hand 32 of the user 30 is detected.

The user 30 can now perform an operating procedure for the image display device 100 with respect to the operating region 20 that is set at a new position. Referring to FIG. 3C, when the user 30 repositions his/her hand 32 at the center of the operating region, the pointer 26 in the operating screen 18 also appears at the center of the operating screen 18.

The steps of the operating region setup process performed by the image display device 100 according to the first embodiment of the present invention will now be described with reference to FIG. 4.

FIG. 4 is a flowchart illustrating the steps of the operating region setup process performed by the image display device 100 according to the first embodiment of the present invention.

The process for predefining the operating region 20 is performed by the system control unit 120 shown in FIG. 1.

First of all, the system control unit 120 analyzes data fed from the input unit 110 to perform a process for recognizing the hand 32 of the user 30.

When the hand 32 is recognized in step S400, step S401 is performed to predefine the operating region 20 in accordance with the position of the hand 32. In this instance, the pointer 26 appears in the operating screen 18.

Next, step S402 is performed to recognize changes in the position of the hand 32 and move the pointer 26 in the operating screen 18 in accordance with the position of the hand 32.

Step S403 is then performed to judge whether the hand 32 is recognized again. If the hand 32 cannot be recognized (when, for instance, the user 30 has lowered the hand 32 or moved the hand 32 out of the imaging region plane 22), step S407 is performed to delete the operating region 20. In this instance, the pointer 26 is also deleted from the operating screen 18. Upon completion of step S407, the system control unit 120 returns to step S400.

If, on the other hand, the hand 32 is recognized, step S405 is performed to judge whether the hand 32 is positioned at an end of the operating region 20 and about to move out of the operating region. If so, step S408 is performed to move the operating region 20 in accordance with the movement of the hand 32. In other words, the operating region 20 follows the movement of the hand 32. Upon completion of step S408, the system control unit 120 returns to step S402.

When, in step S406, the user 32 indicates his/her intention to terminate an operation, for instance, by pressing a "Finish" button in the operating region 20, the system control unit 120 terminates the process. If no such indication is given in step S406, the system control unit 120 returns to step S402.

Second Embodiment

A second embodiment of the present invention will now be described with reference to FIGS. 5 to 7.

A display control method provided by the image display device 100 according to the first embodiment is implemented by using an interface that causes the operating region to follow the movement of the user's hand. The image display device according to the second embodiment offers an interface that not only provides the same display control method as the first embodiment, but also determines the size of the operating region in accordance with the movement of the user's hand.

First of all, the configuration of the image display device according to the second embodiment of the present invention will be described with reference to FIG. 5.

Figure 5:
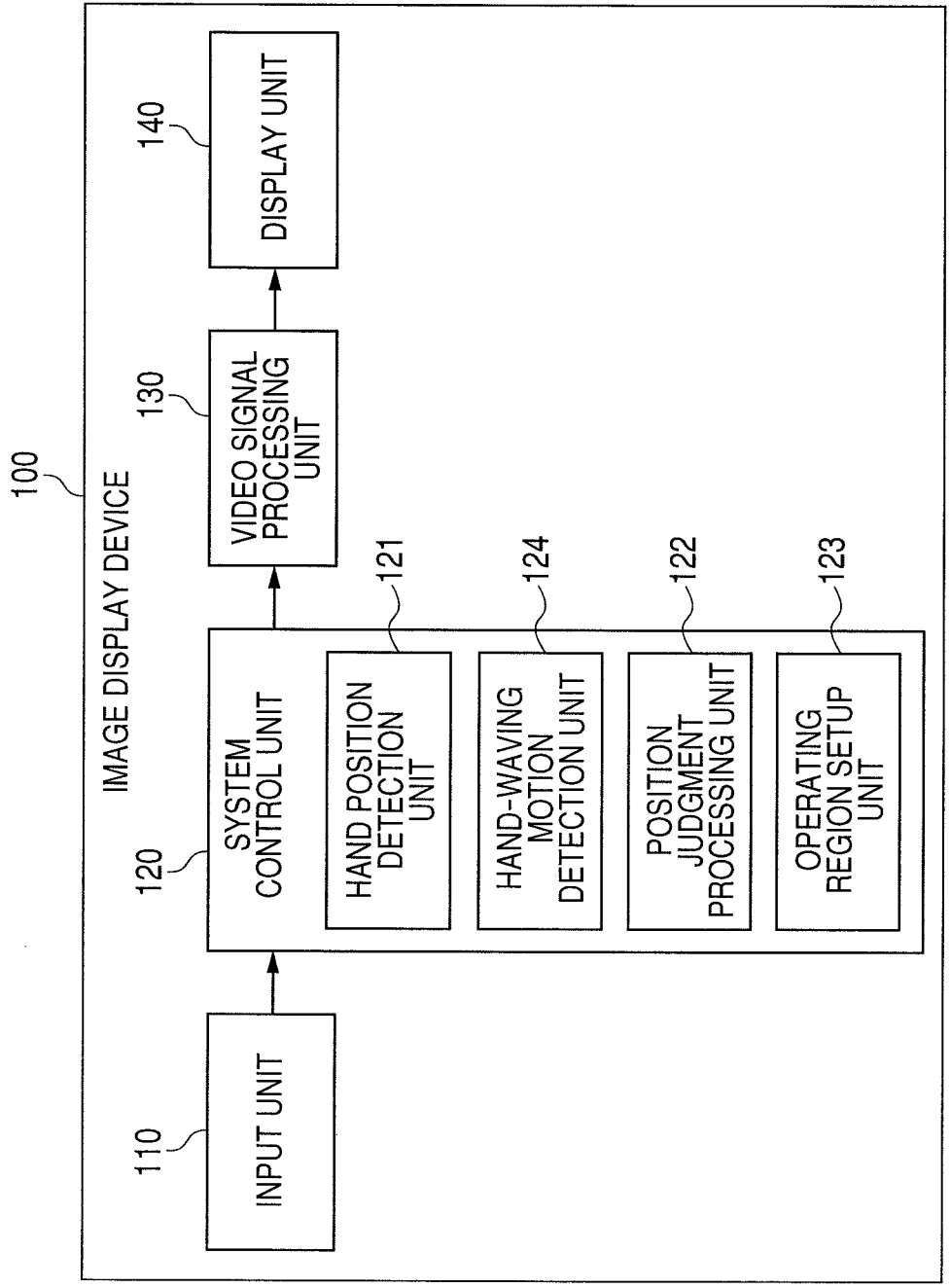
FIG. 5 is a diagram illustrating the configuration of the image display device according to a second embodiment of the present invention.

FIG. 5 is a diagram illustrating the configuration of the image display device according to the second embodiment of the present invention.

As shown in FIG. 5, the image display device 100 according to the second embodiment includes the input unit 110, the system control unit 120, the video signal processing unit 130, and the display unit 140, as is the case with the image display device 100 according to the first embodiment. However, the image display device 100 according to the second embodiment differs from the image display device 100 according to the first embodiment in that the system control unit 120 of the former image display device additionally includes a hand-waving motion detection unit 124.

The hand-waving motion detection unit 124 detects a hand-waving motion of the user 30.

The operating region setup process performed by the image display device 100 according to the second embodiment of the present invention will now be described with reference to FIGS. 6A to 6C.

FIGS. 6A to 6C are diagrams illustrating the flow of the operating region setup process performed by the image display device 100 according to the second embodiment of the present invention.

In the second embodiment of the present invention, the position and size of the operating region 20 are calibrated in accordance with the position and magnitude of a hand-waving motion at the beginning of an operation.

When the size of the operating region 20 is determined in accordance with the magnitude of a hand-waving motion as described above, the user 30 can intentionally adjust the size of the operating region 20. If, for instance, the user 30 waves his/her hand slightly, a small operating region 20a is created as shown in FIG. 6A. If, on the other hand, the user 30 waves his/her hand greatly, a large operating region 20b is created as shown in FIG. 6B.

The above-described hand-waving motion is a distinguishing operation that can easily be differentiated from the other motions (operations).

Further, the use of the above-described hand-waving motion is at an advantage in that an operator can be located even in a situation where two or more persons have extended their hands. FIG. 6C indicates that the hand 32 of the user 30 is waved to generate the operating region 20 and determine its size, and that the hands 33 and 34 of the other persons are irrelevant.

When the above-described operating region setup function based on a hand-waving motion is incorporated, a system for moving the operating region in the direction of the movement of the hand 32 of the user 30 can be established by implementing a scheme for dynamically correcting the calibrated operating region.

The steps of the operating region setup process performed by the image display device 100 according to the second embodiment of the present invention will now be described with reference to FIG. 7.

Figure 7:
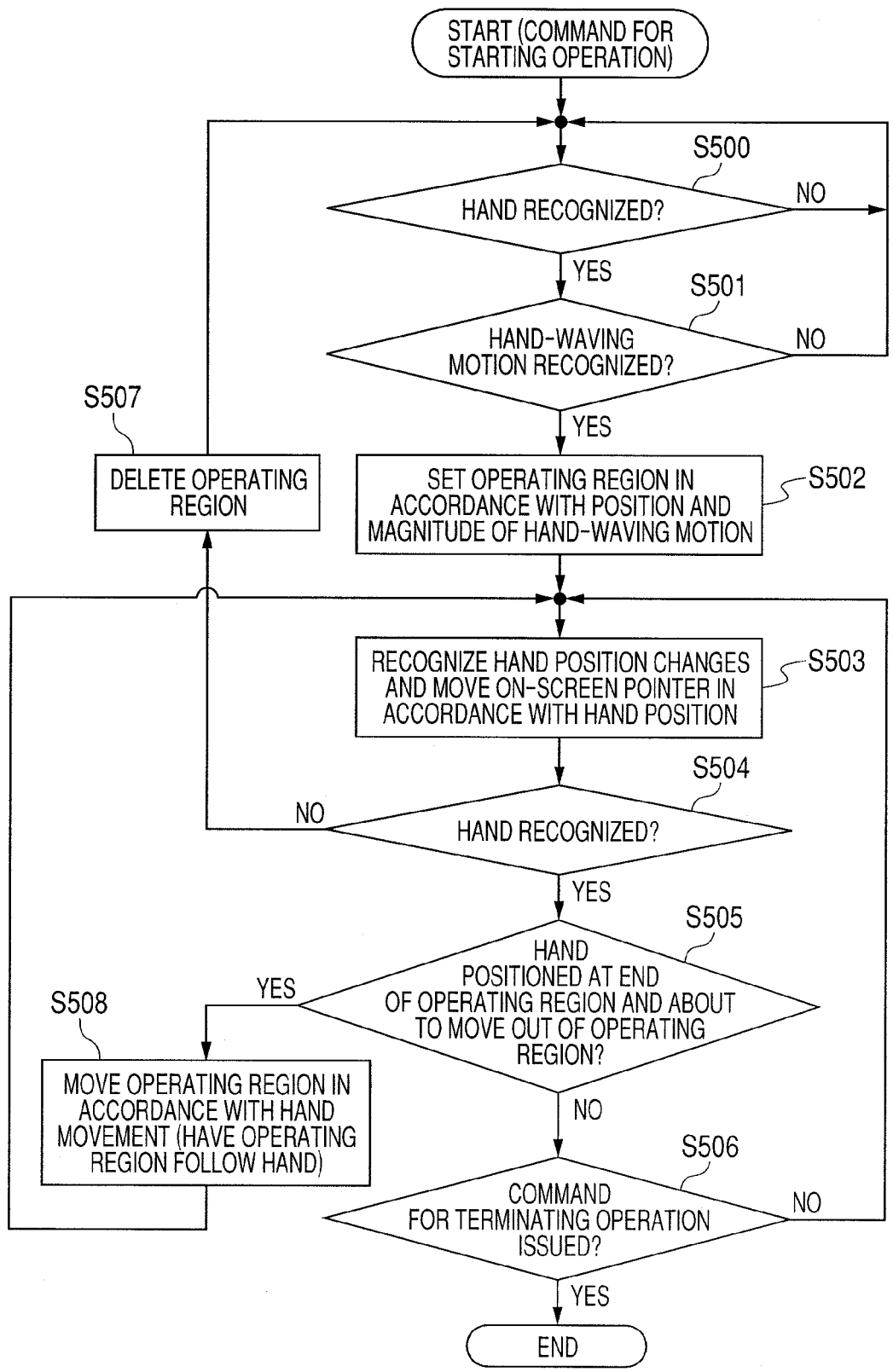
FIG. 7 is a flowchart illustrating the steps of the operating region setup process performed by the image display device according to the second embodiment of the present invention.
Figure 8:
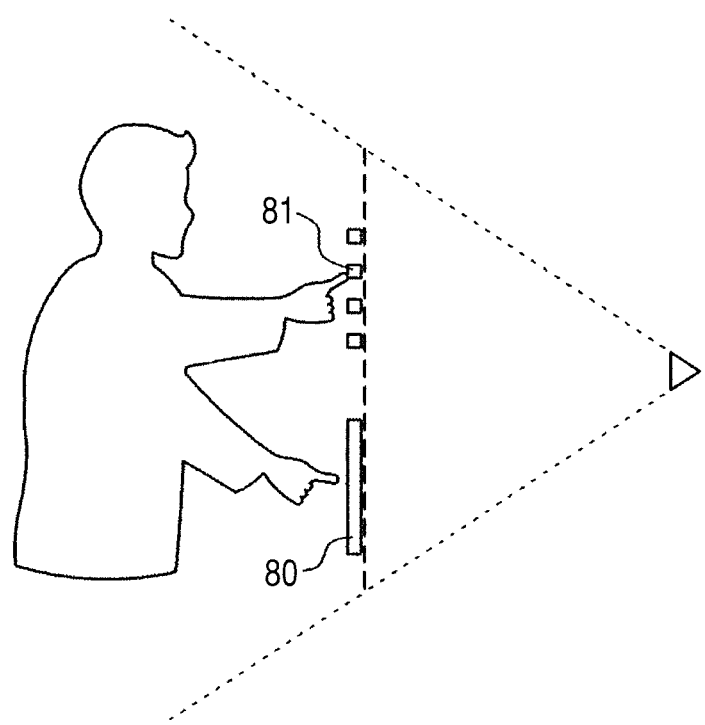
FIG. 8 is a diagram illustrating a case where the operating region is created near the waist of a user when the user extends his/her hand from below.

FIG. 7 is a flowchart illustrating the steps of the operating region setup process performed by the image display device 100 according to the second embodiment of the present invention.

The process for predefining the operating region 20 is performed by the system control unit 120 shown in FIG. 5.

First of all, the system control unit 120 analyzes data fed from the input unit 110 to perform a process for recognizing the hand 32 of the user 30.

When the hand 32 is recognized in step S500, step S501 is performed to judge whether a hand-waving motion is recognized. If a hand-waving motion is recognized, step S502 is performed to predefine the operating region 20 in accordance with the position and magnitude of the hand-waving motion. In this instance, the pointer 26 appears in the operating screen 18.

Next, step S503 is performed to recognize changes in the position of the hand 32 and move the pointer 26 in the operating screen 18 in accordance with the position of the hand 32.

Step S504 is then performed to judge whether the hand 32 is recognized again. If the hand 32 cannot be recognized, step S507 is performed to delete the operating region 20. In this instance, the pointer 26 is also deleted from the operating screen 18. Upon completion of step S507, the system control unit 120 returns to step S500.

If, on the other hand, the hand 32 is recognized, step S505 is performed to judge whether the hand 32 is positioned at an end of the operating region 20 and about to move out of the operating region. If so, step S508 is performed to move the operating region 20 in accordance with the movement of the hand 32. In other words, the operating region 20 follows the movement of the hand 32. Upon completion of step S508, the system control unit 120 returns to step S503.

When, in step S506, the user 32 indicates his/her intention to terminate an operation, for instance, by pressing a "Finish" button in the operating region 20, the system control unit 120 terminates the process. If no such indication is given in step S506, the system control unit 120 returns to step S503.

As described in connection with the first and second embodiments, the display control method of the image display device according to the present invention differs from the conventional technology described in Japanese Patent No. 4318056 and makes it possible to determine the position of the operating region without regard to the position and attitude of the body of a user when the user extends his/her hand. In other words, a person who extends his/her hand can be identified as an operator no matter whether there are two or more persons.

Further, the display control method of the image display device according to the present invention dynamically changes the operating region in accordance with the movement of the user's hand after the operating region is predefined. This provides increased ease of operation because the timing of calibration need not be determined in the middle of an operation.

As described above, the present invention provides an easy-to-operate image display device that recognizes a user's hand and defines the operating region in accordance with the user's intention without imposing a significant processing load on itself.

What is claimed is:

1. An image display device that picks up an image of a user and provides a display corresponding to an operation of the user on a display screen, the image display device comprising:

a 3D camera, which is configured to pick up the image of the user including a hand thereof and recognize the hand from said image, and thereby to measure a distance from the display screen to the hand;

an operating region setup unit which sets an operating region where the user can perform the operation, within an imaging region of said 3D camera, depending on the distance from the display screen to the hand, which is measured by said 3D camera; and a control unit which controls a display of a pointer on said display screen corresponding to the hand operating within said operating region, and to move the displayed pointer according to a movement of the hand when the hand is moved in said operating region, wherein the control unit causes the operating region to follow the position of the hand when the hand is about to move beyond the periphery of the operating region, dynamically changing the operating region in accordance with the movement of the hand, wherein said 3D camera recognizes a hand-waving motion of the user, and wherein the operating region setup unit sets the size of the operating region in accordance with the magnitude of the user's hand-waving motion.

2. A display control method of an image display device that picks up an image of a user through a 3D camera, and provides a display corresponding to an operation of the user on a display screen, the display control method comprising:

a step for picking up the image of the user including a hand thereof and recognizing the hand from said image, and thereby for measuring a distance from the display screen to the hand;

an operating region setup step of predefining an operating region where the user can perform the operation, within an imaging region of said 3D camera, depending on the distance from the display screen to the hand, which is measured by said 3D camera; and a display step of allowing to display a pointer on the display screen corresponding to the hand operating within the operating region, and to move the displayed pointer according to the movement of the hand, when the hand is moved in the operating region, wherein the operating region is dynamically changed in accordance with the movement of the hand to follow the position of the hand when the hand is about to move beyond the periphery of the operating region, wherein in the step of measuring the distance, a hand-waving motion of the hand is recognized, and wherein in the operating region setup step, the size of the operating region is set in accordance with the magnitude of the hand-waving motion.

* * * * *